July 3, 1956
R. W. TRICKLE, JR
UNIVERSAL PROTECTIVE COVERING CUTTER
FOR COAXIAL AND OTHER CABLES
2,752,676
Filed Nov. 18, 1955
2 Sheets-Sheet 1
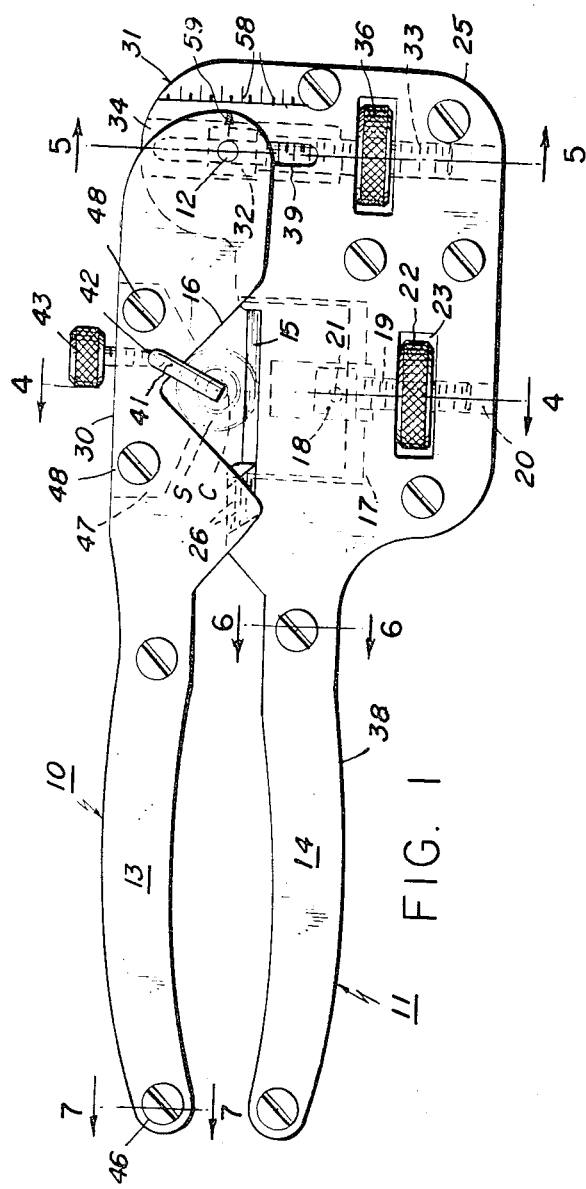
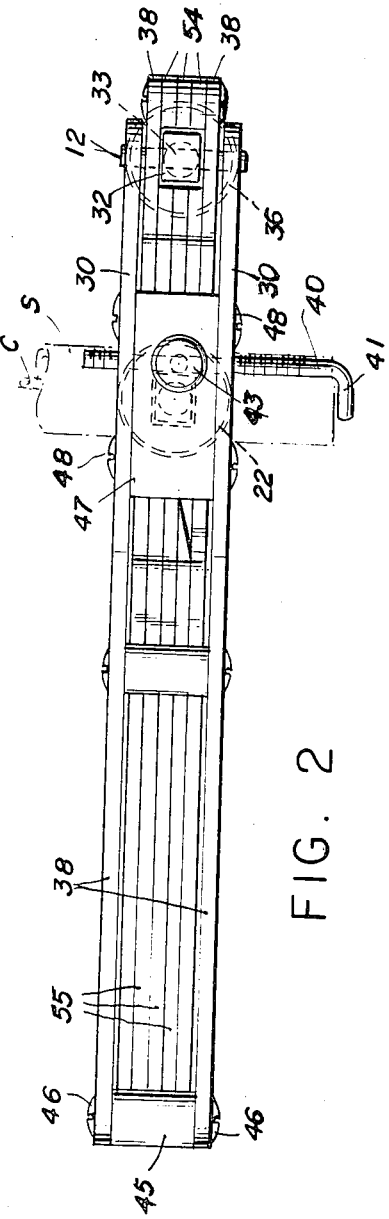
INVENTOR
RUSSELL W. TRICKLE, Jr.
BY *J. B. Wilson & Co.*
ATTORNEYS

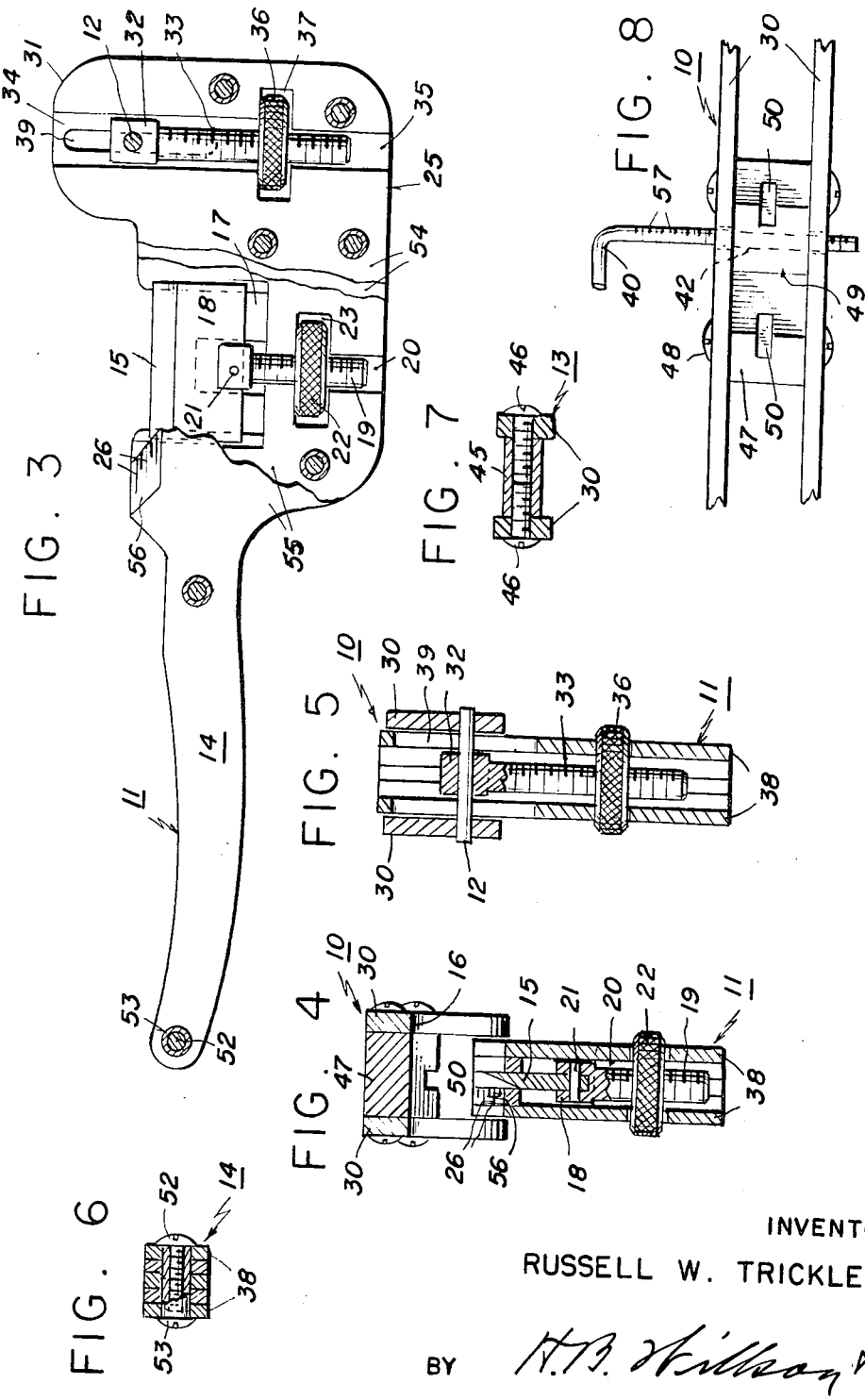

ated July 3, 1956

United States Patent Office

2,752,676

UNIVERSAL PROTECTIVE COVERING CUTTER FOR COAXIAL AND OTHER CABLES

Russell W. Trickle, Jr., Janesville, Wis., assignor to Dittmore-Freimuth Corp., Milwaukee, Wis., a corporation of Wisconsin Application November 18, 1955, Serial No. 547,723

10 Claims. (Cl. 30—91)

This invention relates to hand tools for cutting circumferentially the various coaxial layers and protective coverings or sheaths on coaxial and other cables to prepare them for splicing.

Coaxial cables, power and communication lines and other cables and electrical conductors have one or more protective and insulating coverings or sheaths made of polyvinyl, polyethylene, rubber or other materials; and such cables often need to be spliced. In order to form effective splices of the several portions of the cable, it is important to remove predetermined axial lengths of the layers or sheaths at the ends to be spliced and to leave the sheaths with ends that are in planes at right angles to the axis of the cables so that molded sheath replacement elements may be used to make the splice. It is also important that the conductor or conductors be not damaged during the removal of the end portions of the sheaths. That is especially the case with respect to coaxial cables in which the size and concentricity of the inner and outer conductors must be maintained throughout the splice in order to prevent any attenuation of the signal at the splice or any reflected waves traveling back to the source, from the splice. In the past it has been a slow and tedious job to cut completely through a protective sheath without damaging the underlying conductor and to leave the sheath with a square cut end at a predetermined distance from the extremity of the conductor or cable end.

The principal object of the invention is to provide a and tool to perform such cutting operations, the tool being adjustable for use on cables of various diameters and for cutting through sheaths or layers of different thicknesses.

Another object of the invention is to provide a cutting tool which may be adjusted to cut completely through a sheath or covering of any uniform thickness without danger of cutting or damaging the conductor beneath the sheath.

Another object is to provide a universal tool of the above character which may be quickly and accurately adjusted, which may be used by an unskilled person to do effective work, and which is strong, durable and relatively inexpensive.

With the above and other objects and advantages in view, the invention resides in the novel combinations and arrangements of parts and the novel features of construction hereinafter described and claimed, and illustrated in the accompanying drawings which show the present preferred embodiment of the invention.

In the drawings:

Fig. 1 is a side view of the new cutting tool;

Fig. 2 is a top view;

Fig. 3 is a detail side view of the lower jaw lever with its outer plate removed, with the next adjacent plate broken away and with parts in section;

Fig. 4 in a vertical cross section on line 4—4 in Fig. 1 showing the cutter blade adjustment;

Fig. 5 is a vertical cross section on line 5—5 in Fig. 1 showing the adjustment of the pivot or hinge pin connecting the two lever members;

Figs. 6 and 7 are detail vertical cross sections taken respectively on the lines 6—6 and 7—7 in Fig. 1; and Fig. 8 is a detail view of a part of the upper lever showing the insert block between its two plates.

Referring more in detail to the drawings the numerals 10 and 11 denote generally two hand lever members connected at one end by a pivot 12 so that their handle ends 13 and 14 may swing toward and from each other, the lower member 11 carrying a longitudinally extending cutter blade 15 movable toward and from a transversely extending anvil or seat 16 on the opposed portion of the upper lever member 10. When the handles 13 and 14 are moved away from each other, the cable may be placed between the levers transversely thereof so that it rests in the seat 16, and when the handles are moved toward each other the blade 15 will be forced into the sheath so that upon rotation of the tool around the cable the blade will make a circumferential cut entirely through the sheath, as will be understood upon reference to Fig. 1 in which the cable C and its sheath S are indicated by dotted lines. The seat 16 is substantially V-shape so as to center and support cables of different diameters, and blade 15 is slidably adjustable transversely of the lever 11 to control the depth of the cut and hence permit sheaths or other layers of different thickness to be cut entirely through them without damage to the underlying conductor.

The blade 15 is shown as a rectangular steel plate slidably positioned in a longitudinal recess 17 in the inner face of the lever 11 and having its exposed long edge bevelled to form a cutting edge. The central portion of the inner edge of the blade plate 15 is in a flat walled recess in a rectangular head 18 on an adjusting screw 19 freely movable in an opening 20 formed in the lever 11 and opening into the blade guiding recess 17. A cross pin 21 fastens the screw head to the blade. A cylindirical nut 22 with a milled outer edge is threaded on the screw and is disposed in a transverse slot or opening 23 formed in the lever 11 so that when the nut is rotated the screw will be moved in an axial direction to adjust the cutter blade. These parts are mounted in a laterally enlarged front portion 25 of the lever but the nut has a diameter greater than the thickness of the enlargement so that its milled edge extends outwardly from both sides of the tool. The sharp bevelled cutting edge of the blade 15 coacts with scale graduations 26 formed on the lever adjacent one end of the blade to facilitate setting the blade in a desired position of adjustment.

In order to permit the use of the tool on different types of cables of greatly varying sizes or diameters, the pivot or hinge pin 12 is mounted for adjustment transversely of the length of the levers 10 and 11. That is preferably done by making the upper lever 10 from two identically shaped parallel plates 30 spaced apart so that a laterally projecting portion 31 on the enlarged front portion 25 of the lower lever 11 may be disposed between the front ends of the plates 30 to receive the ends of the pivot 12. The latter is a cylindrical pin removably mounted in a rectangular head 32 on an adjusting screw 33. The screw 33 extends transversely of the width of the enlargement, its enlarged head 32 being guided in a rectangular hole or opening 34 in the upper edge of the lever. The lower end of the screw is freely movable in a similar opening 35 in the lower edge, as seen in Fig. 3. The screw is moved lengthwise to adjust the pin 12 by a cylindrical nut 36 threaded on the screw disposed in a transverse slot 37 in the enlargement 25. The nut has a diameter greater than the thickness of the lever so that its milled edge projects beyond the side faces of the enlargement and may be readily grasped between the fingers and thumb. As later explained the lever 11 is preferably of laminated construction, and includes two similar outer metal plates 38 which are formed with transversely extending slots 39 in which the pin 12 moves when the nut is rotated.

Since it is important to strip the same length of sheath from the two cable ends to be joined, the tool may be provided with an adjustable gage 40 having a portion to engage the extremity of the cable and thus position the tool at the desired distance from the cable end. This gage is a right angular rod with a short arm 41 to abut the end of the cable. The long arm or body of the rod is slidably adjustable in a transverse hole 42 in the lever 10 adjacent the seat 16 and is held in an adjusted position by a set screw 43.

As above noted the upper lever 10 comprises two side plates 30, the handle ends of which are spaced apart in parallel relation by spacing sleeves or tubes 45. As shown in Fig. 7, these sleeves are internally screw threaded to receive screws 46 in openings in the plates. The front portions of the plates are laterally enlarged and have V-shaped notches which form the seat 16. These enlarged portions of the plates are spaced apart by a metal block 47 shown in Fig. 8 and fastened by screws 48. The inner face of this block is formed with a transverse notch 49 which is V-shaped and alined with the notches in the plates 30 to provide an additional bearing for the cable. Centrally positioned longitudinally extending notches 50 are formed in the inner face of the block and into which the cutting edge of the blade extends when the tool is adjusted for use on cables of small diameters. The block is formed with the hole 42 for the gage rod 40 and concentric larger holes are formed in the plates 30 for that rod. The set screw 43 is mounted in the top of the block.

The laminated construction of the lower lever 11 comprises the two outer metal plates 38 and three inner plates or laminations, all five of the laminations being fastened by a plurality of screws 52 threaded into tubular nuts 53, these parts being arranged in alined openings in the laminations as shown in Fig. 6. While each of the three inner laminations might be a single metal plate, I preferably use three suitably shaped plates 54 at the front of the lever and three suitably shaped plates 55 at the rear of the lever. The slots or openings 23, 37 and 39 are formed in the outer plates 38, and one or more suitable recesses or openings are formed in the inner plates or laminations to provide the recesses or openings 17, 20, 34 and 35, and portions of the slots 23 and 37. The thickness of the cutter blade 15 corresponds to the thickness of the central laminations 54 and 55, and one of the next adjacent of the inner laminations is formed with bevelled area 56 adjacent one side of the blade, the graduations 26 being stamped on such bevelled area.

If desired scale graduations 57 may be marked along the long arm of the gage 40 to facilitate quick adjustment of the latter.

If desired a row of scale graduations 58 may be stamped on one of the plates 38 adjacent its slot 39 to coact with an arrow 59 stamped on the adjacent plate 30 of the lever 11 to facilitate the quick adjustment of the hinge pin 12 so that the tool may be readily and satisfactorily used on a cable of some particular size.

In using the tool to cut through a sheath of a particular thickness, the blade 15 is adjusted so that its cutting edge projects the desired distance beyond the adjacent edges of the plates 38. The hinge pin 12 is adjusted according to the size of the cable, and the gage 40 is adjusted so that when its end 41 is abutted against the end of the cable, the cutter blade will be disposed to cut the desired length of sheath. Upon the closing of the tool on the cable, the cutter will be forced into the sheath to its full thickness. The tool is then rotated around the cable to make a complete circumferential cut. When the tool is removed, the severed portion of the sheath may be pulled lengthwise off of the conductor, or a longitudinal cut may be made in the severed sheath and the latter stripped off of the conductor. The same length of sheath will be cut from each cable end so that a pre-mold sheath section or sections may be used to replace the removed sheath portions in making a bonded splice in the particular sheath or covering being spliced. Because of the several adjustments, the tool is of substantially universal application in cutting sheaths or layers of different thicknesses on a large variety of kinds and sizes of cables and conductors.

From the foregoing, taken in connection with the accompanying drawing, it will be seen that novel and advantageous provision has been made for carrying out the objects of the invention, and while preferences have been disclosed, attention is invited to the possibility of making variations within the scope of the invention as claimed.

I claim:

1. In a cutting tool of the character set forth, a pair of pivotally connected hand levers, one of said levers having on its inner edge a transverse seat for a conductor cable and the other lever having a laterally enlarged portion formed in its inner edge with an elongated rectangular recess which extends longitudinally of this lever and is opposite said seat, said enlarged portion being also formed with a transversely extending recess which opens into the center of said longitudinally extending recess and which is intersected by a slot also formed in said enlarged portion and opening on opposite sides of the latter, a rectangular cutter blade slidable in said rectangular recess and having a cutting edge disposed opposite said seat, a screw rotatable in said transverse recess and having an end fixed to the center of said cutting blade, and a ring-like nut threaded on said screw and rotatably disposed in said slot with its edge projecting beyond the outer side faces of said enlarged portion.

2. In a cutting tool of the character set forth, a pair of hand levers, one of said levers having on its inner edge a transverse seat for a conductor cable and the other lever carrying a cutter in opposed relation to said seat, and an adjustable pivotal connection between said levers at one end of the tool to permit the latter to be used for a greater range of cable sizes, said connection comprising a laterally enlarged portion at an end of one of the levers disposed in a recessed portion of the adjacent end of the other lever, said recessed portion being formed with alined pivot openings and said enlarged portion being formed with a transverse recess, a slot intersecting the latter and alined transversely extending slots which open into the sides of said transverse recess, a screw disposed in said transverse recess, a pivot pin carried by one end of the screw and projecting through said alined slots and into said alined pivot openings, and a ring-like nut threaded on said screw and disposed in said slot with its edge portion projecting beyond the outer side faces of said enlarged portion.

3. A cutting tool for cables and conductors comprising a pair of hand levers, means pivotally connecting the levers at one end, a transversely extending cable engaging seat at the inner edge of one of the levers, a sheath cutting blade in opposed relation to said seat on the other lever, said blade extending in a longitudinal direction and being slidable transversely of the said other lever with its cutting edge projecting beyond the inner edge of the lever, means between said blade and its lever to vary the extent of projection of the cutting edge of the blade and a transverse row of scale graduations on said other lever at one end of said blade to coact with the cutting edge of the blade and indicate the depth of the cut which the blade will make when in an adjusted position.

4. A cutting tool for cables and conductors comprising a pair of hand levers, means pivotally connecting the levers at one end, a transversely extending cable engaging seat at the inner edge of one of the levers, a sheath cutting blade in opposed relation to said seat on the other lever, said blade extending in a longitudinal direction and being slidable transversely of the said other lever with its cutting edge projecting beyond the inner edge of the lever, means between said blade and its lever to vary the extent of projection of the cutting edge of the blade and an adjustable gage to dispose the cutter blade at a predetermined distance from the end of a cable when the tool is applied to the latter, said gage being an angular rod having a short arm to abut the end of a cable and a long arm slidable in a transverse opening in the said lever, and a set screw in the latter to bind the long arm in an adjusted position.

5. A cutting tool for cables and conductors comprising a pair of hand levers, means pivotally connecting the levers at one end, a transversely extending cable engaging seat at the inner edge of one of the levers, a sheath cutting blade in opposed relation to said seat on the other lever, said blade extending in a longitudinal direction and being slidable transversely of the said other lever with its cutting edge projecting beyond the inner edge of the lever, and means between said blade and its lever to vary the extent of projection of the cutting edge of the blade, said means pivotally connecting the levers comprising a transverse hinge pin forming the axis about which the levers swing and means carried by one of the levers to adjust the hinge pin transversely of that lever.

6. The structure of claim 5 in which the last-mentioned means comprised a screw which carries the hinge pin and which is axially movable transversely of said one of the levers and a nut on the screw and rotatably mounted in that lever.

7. In a cutting tool of the character set forth having a lower hand lever carrying a longitudinally extending sheath cutting blade projecting from its inner edge, an upper hand lever comprising laterally spaced side plates, the front ends of which receive between them a portion of the front end of the lower lever and are pivotally connected to the latter, said side plates having at their inner edges alined substantially V-shaped notches forming cable engaging seats opposed to said cutting blade, and a spacing block fastened between said plates and having on its inner side a substantially V-shaped notch alined with said notches in the plates for engagement with a cable disposed in said seats.

8. In a cutting tool of the character set forth having upper and lower hand levers pivotally connected at their front ends, the upper lever having at its inner edge a cable engaging seat opposed to a laterally enlarged front portion of the lower lever, there being a rectangular longitudinally extending cutting blade, a transverse screw fixed thereto and a nut on said screw all mounted in said enlarged portion of the lower lever, said lower lever being of laminated formation and comprising two outer side plates and three inner sectional plates, all five of the plates or laminations being rigidly secured together by transverse fastenings, the inner-most plates opposite said seat being cutaway to provied a rectangular recess to slidably receive said cutting blade, certain of said inner plates being cut away to slidably receive said screw for axial movement, and all of said plates having aligned openings to receive said nut for rotary movement.

9. In a cutting tool of the character set forth having upper and lower hand levers, the upper lever having an open front end and at its inner edge a cable engaging seat opposed to a laterally enlarged front portion of the lower lever, there being a longitudinally extending sheath cutting blade projecting from the inner edge of said enlarged portion opposite said seat, there also being a transversely adjustable pivotal connection between the front portions of the levers including a hinge pin carried by a screw and a nut on the screw to move it axially, said lower lever being of laminated formation and comprising two outer plates and three inner sectional plates, all five of the plates or laminations being rigidly secured together by transverse fastenings, all five of said paltes having alined openings to rotatably receive said nut, certain of said inner plates being cut away to slidably receive said screw, said outer plates having slots to slidably receive said hinge pin, the said open front end of the upper lever receiving the slotted portions of said outer plates and having openings to receive the ends of said hinge pin.

10. The structure of claim 9 together with a row of scale graduations extending along the slot in one of said side plates and coacting with a mark on the adjacent side of the open front end of the upper lever.

References Cited in the file of this patent
UNITED STATES PATENTS

| | | |
|---|---|---|
| 562,097 | Rieckel | June 16, 1896 |
| 2,419,511 | Vaughan | Apr. 22, 1947 |